United States Patent [19]

Zaiser

[11] Patent Number: 4,719,985

[45] Date of Patent: Jan. 19, 1988

[54] DRIVE ARRANGEMENT FOR A MOTOR VEHICLE WITH FOUR-WHEEL DRIVE

[75] Inventor: Wolfgang Zaiser, Steinheim, Fed. Rep. of Germany

[73] Assignee: Daimler-Benz Aktiengesellschaft, Stuttgart, Fed. Rep. of Germany

[21] Appl. No.: 935,217

[22] Filed: Nov. 26, 1986

[30] Foreign Application Priority Data

Nov. 30, 1985 [DE] Fed. Rep. of Germany ....... 3542416

[51] Int. Cl.⁴ ..................... B60K 17/354; F16H 1/44
[52] U.S. Cl. .................... 180/245; 74/710.5; 180/248; 180/249
[58] Field of Search ............... 280/245, 246, 247, 248, 280/249, 250, 233; 74/710.5, 682, 674, 665 R; 192/3.51, 3.52

[56] References Cited

U.S. PATENT DOCUMENTS

| | | | |
|---|---|---|---|
| 3,378,093 | 4/1968 | Hill | 180/249 |
| 3,908,775 | 9/1975 | Van Fossen | 74/710.5 |
| 4,216,843 | 8/1980 | Fukata | 180/245 |
| 4,476,953 | 10/1984 | Hiraiwa | 180/249 |
| 4,577,721 | 3/1986 | Ashikawa | 180/248 |
| 4,605,084 | 8/1986 | Haynes | 180/233 |
| 4,627,513 | 12/1986 | Tutzer | 74/710.5 |
| 4,667,767 | 5/1987 | Shea et al. | 180/248 X |
| 4,672,861 | 6/1987 | Lanzer | 74/710.5 |

FOREIGN PATENT DOCUMENTS 0135328 7/1985 Japan ..................... 180/248

Primary Examiner—James T. McCall
Attorney, Agent, or Firm—Barnes & Thornburg

[57] ABSTRACT

A drive arrangement for a motor vehicle having a four-wheel drive establishable by connecting one wheel axle with another drivable wheel axle, wherein one wheel axle can be driven via an auxiliary drive shaft and a gear shift transmission, arranged in parallel with respect to its input shaft from an engine.

This auxiliary drive shaft can be used for forming at least one gear transmission when the input shaft and the auxiliary drive shaft are brought into direct driving connection with one another by means of an auxiliary transmission. At least one of these two shafts can be clutched into driving connection with the auxiliary transmission. The clutch can be engaged only when the torque transmission in the gear shift transmission is interrupted or an interaxle differential is in effect that is connected between the two wheel axles.

20 Claims, 4 Drawing Figures

FIG. 4

| GEAR | | GEAR SHIFT TRANSMISSION | | | | | | FOUR-WHEEL | | | AUXILIARY TRANSMISSION 10 \| 11 \| 12 | | | |
|---|---|---|---|---|---|---|---|---|---|---|---|---|---|---|
| | | CLUTCH | | | BRAKE | | | CLUTCH | | | CLUTCH | | | |
| | | 48 | 50 | 47 | 49 | 51 | 52 | 28 | 33 | 36 | 60 | 13 | 15 | 14 |
| I(11) | Fig.1 | | | | | | | ● | | ● | | ● | | |
| | Fig.2 | | | | | | | | ● | ● | | ● | | |
| | Fig.3 | | | | | | | ● | | | | | ● | |
| I | | | ● | ○ | | | ● | | | | | | | |
| II | | | | | ● | | ● | | | | | | | |
| III | | ● | | | | | ● | | | | | | | |
| IV | | ● | ● | | | | | | | | | | | |
| V | Fig.1 | ● | ● | | | | | | | | | ● | | |
| | Fig.3 | | | | | | | ● | | | | | | ● |
| R | | | ● | ○ | | ● | | | | | | | | |
| R(10) | | | | | | | | ● | | | ● | | | |

4,719,985

DRIVE ARRANGEMENT FOR A MOTOR VEHICLE WITH FOUR-WHEEL DRIVE

BACKGROUND AND SUMMARY OF THE INVENTION

The invention relates to a drive arrangement for a motor vehicle having a four-wheel drive establishable by connecting one wheel axle with another drivable wheel axle and wherein the one wheel axle is drivable via an auxiliary drive shaft and a gear shift transmission, arranged in parallel with respect to its input shaft drive.

In the case of a known drive arrangement of this type having a connectable rear axle drive (Journal OFF ROAD, 1985, No. 4, page 34), the driving engine and a hydrodynamic torque converter are arranged in front of and a planetary gear shift transmission is arranged behind the front axle. The auxiliary drive shaft is arranged coaxially to the pinion shaft of the front axle differential gear, and at both shaft ends is equipped with a spur gear fixed with respect to it. The output shaft of the gear shift transmission that is penetrated by the input shaft, at its front shaft end facing the front axle, is equipped with a gear that mates with the front gear of the auxiliary drive shaft. A drive shaft that is coaxial to the input shaft leads to the rear axle drive and carries a gear mating with the rear gear of the auxiliary drive shaft. This gear, by means of a clutch, can be engaged with its drive shaft for driving of the rear axle drive. When the rear axle drive is not connected, the auxiliary drive shaft with the gear stage and the clutch for the connecting of the rear axle drive represent unutilized constructional expenditures.

From U.S. Pat. No. 3,908,775 to Van Fossen, it is known to shift the interaxle differential of a transfer case for a four-wheel drive, changing the drive as well as the output between two shifting stages. In one shifting stage for a balanced four-wheel drive, the output shaft of the differential is driven by the engine, while the two central gears of the transmission output are brought into driving connection with one drive shaft respectively. In the other shifting stage for an unbalanced four-wheel drive, the drive on the side of the engine takes place onto one central gear of the differential, the other central wheel of which is braked to a standstill. In this case, the output shaft rotates more slowly and drives both vehicle axles.

The instant invention is based on the objective of achieving a better utilization of the auxiliary drive shaft in the case of a drive arrangement of the above type.

An object of the invention is obtained by a drive arrangement for a motor vehicle having a four-wheel drive establishable by connecting one wheel axle with another drivable wheel axle, wherein the one wheel axle is drivable via an auxiliary drive shaft and a gear shift transmission, arranged in parallel to the axis of its input shaft and wherein the auxiliary drive shaft and input shaft can be brought into direct driving connection with one another by means of an auxiliary transmission. At least one of these input and auxiliary shafts are clutched into driving connection with the auxiliary transmission only when the torque transmission in the gear shift transmission is interrupted and an interaxle differential means that is connected between the two wheel axles is brought into an unblocked condition.

In the case of the drive arrangement according to the invention, it is possible to form a forward gear and/or a reverse gear independently of the gear shift transmission, i.e., without requiring any partial engagement transmission of the latter.

Another object of the invention is to provide at least two alternative auxiliary transmission paths between the input shaft and the auxiliary drive shaft.

Another object of the invention is to provide a third alternative auxiliary transmission path between the input shaft and the auxiliary drive shaft to provide for a reverse driving direction.

It is another object of the invention to provide for plural drive trains between an engine and auxiliary drive shaft utilizing a hydrodynamic flow converter, gearing transmission, interaxle differential and hollow drive shafts which will provide for 5 normal forward speeds, as well as a low forward speed and two reverse forward speeds.

These and other objects, features, and advantages of the present invention will become more apparent from the following description when taken in connection with the accompanying drawings which show, for the purposes of illustration only, plural embodiments in accordance with the present invention, and wherein:

BRIEF DESCRIPTION OF THE DRAWINGS

FIG. 4 is an overview in tabular form of the possible speeds and of the shifting elements of the drive arrangement according to the invention that become operative for the desired individual speeds.

DETAILED DESCRIPTION OF THE DRAWINGS

Figure 1:
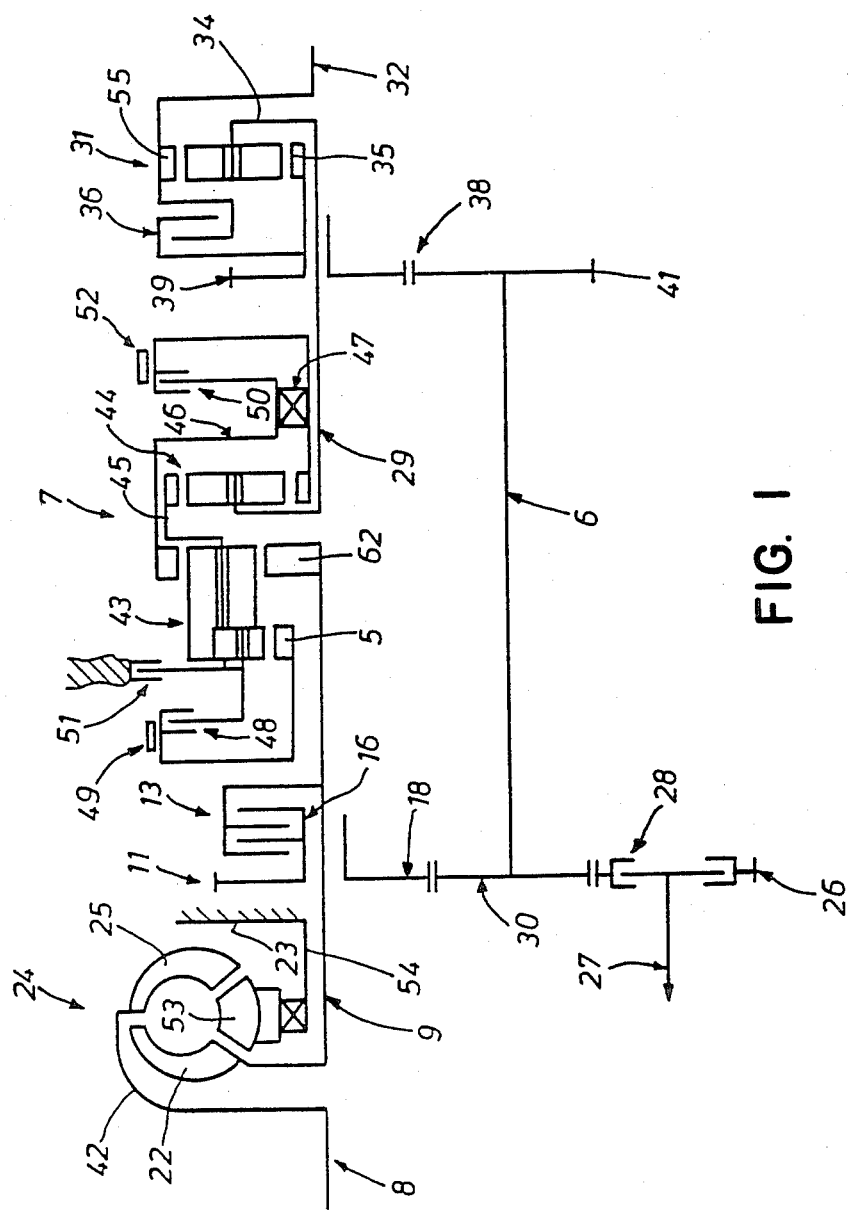
FIG. 1 is a schematically shown drive arrangement according to the invention of a first embodiment with a connectable front axle drive.

Referring now to the drawings wherein like reference numerals are used to designate like parts and more particularly to FIG. 1, a crankshaft of an internal-combustion engine 8 is shown drivingly connected with a case shell 42 of a hydrodynamic torque converter 24, said case shell 42 is drivingly connected with the impeller 25 of the torque converter 24. The output rotor 22 is drivingly connected with an input shaft 9 of a planet-wheel gear shift transmission 7. The stator 53 of the torque converter 24, is connected via a one-way clutch with a hollow stator shaft 54 that can be fixed at a radial housing wall 23 so that it cannot be rotated against the rotating direction of the drive as is conventional in torque converters.

The gear shift transmission 7 has a front Ravigneaux-type planetary gear unit 43 and a simple rear planetary gear unit 44 that are directly coupled by means of a first coupling shaft 45. A parallel driving arrangement couples planetary gear units 43 and 44 via a one-way clutch 47 and a gear shift clutch 50 by means of a second coupling shaft 46. The first coupling shaft 45 connects a rear ring gear of the planetary unit 44 with a front planetary carrier of the first planetary gear unit 43 and can be coupled by means of the clutch 48 with a smaller sun gear 5 of the first planetary gear unit 43 that mates with a secondary planetary 43 of the first planetary gear unit and can also be braked by means of a brake 51. The second coupling shaft 46 connects the front ring gear of the first planetary unit 43 with a rear sun gear of the rear planetary unit 44 with the aid of the clutches 47 and 50. The input shaft 9 drives a larger sun gear 62 of the front planetary gear unit 43 which, like the pertaining ring gear, mates directly with the main planet of this unit. The planetary carrier of the rear planetary gear unit 44, is drivingly connected with the output shaft 29 of the gear shift transmission 7. Finally, the smaller sun gear 5 of the planetary gear unit 43 and the sun gear of the rear planetary gear unit 44 can be braked by either brake 49 or 52, respectively. The output shaft 29 is connected with a coaxial drive shaft 32 that leads to the rear axle drive. An auxiliary drive shaft 6 can also be driven by the output shaft 29 via a gear stage 38, said auxiliary drive shaft 6 is arranged parallel to the axes of the input and output shaft 9 and 29 of the gear shift transmission 7. The auxiliary drive shaft 6 is drivingly connected at its rear end with a gear wheel 41 of the gear transmission stage 38 and at its front end with a gear wheel 30. The front gear wheel 30 mates with a gear wheel 26 of a pinion shaft 27 that leads to the front axle drive.

The output shaft 29, is drivingly connected with a spur gear 39 by means of an interaxle differential 31, that forms the input gear wheel of the gear transmission stage 38 and is rotatably disposed on the output shaft 29. The spur gear 39 mates directly with the gear wheel 41 of the auxiliary drive shaft 6. For the interaxle differential 31, a planetary gear unit is used. The sun gear 35 of the interaxle differential is drivingly connected with the spur gear 39, while the planetary carrier is drivingly connected with the output shaft 29 of the rear planetary unit 44 and the ring gear 55 of which is drivingly connected with the drive shaft 32 of the rear axle. The interaxle differential 31 can be blocked by means of a blocking clutch 36 connected with the sun gear 35 and the ring gear 55. In the case of the embodiment of FIG. 1, the pinion shaft 27 of the front axle is drivingly connected with the gear wheel 26 by means of a clutch 28. In the case of the embodiment of FIG. 2, the pinion shaft 27 and the gear wheel 26 are directly drivingly connected with one another and in contrast, the drive shaft 32 for the rear axle drive can be connected and disconnected with respect to the interaxle differential by means of the clutch 33. In the case of the embodiment of FIG. 2, the input wheel 39 of the gear wheel stage 38 is connected with the ring gear 55 of the interaxle differential 31, while the blocking clutch 36 connects the planetary carrier 34 with the sun gear 35.

Figure 2:
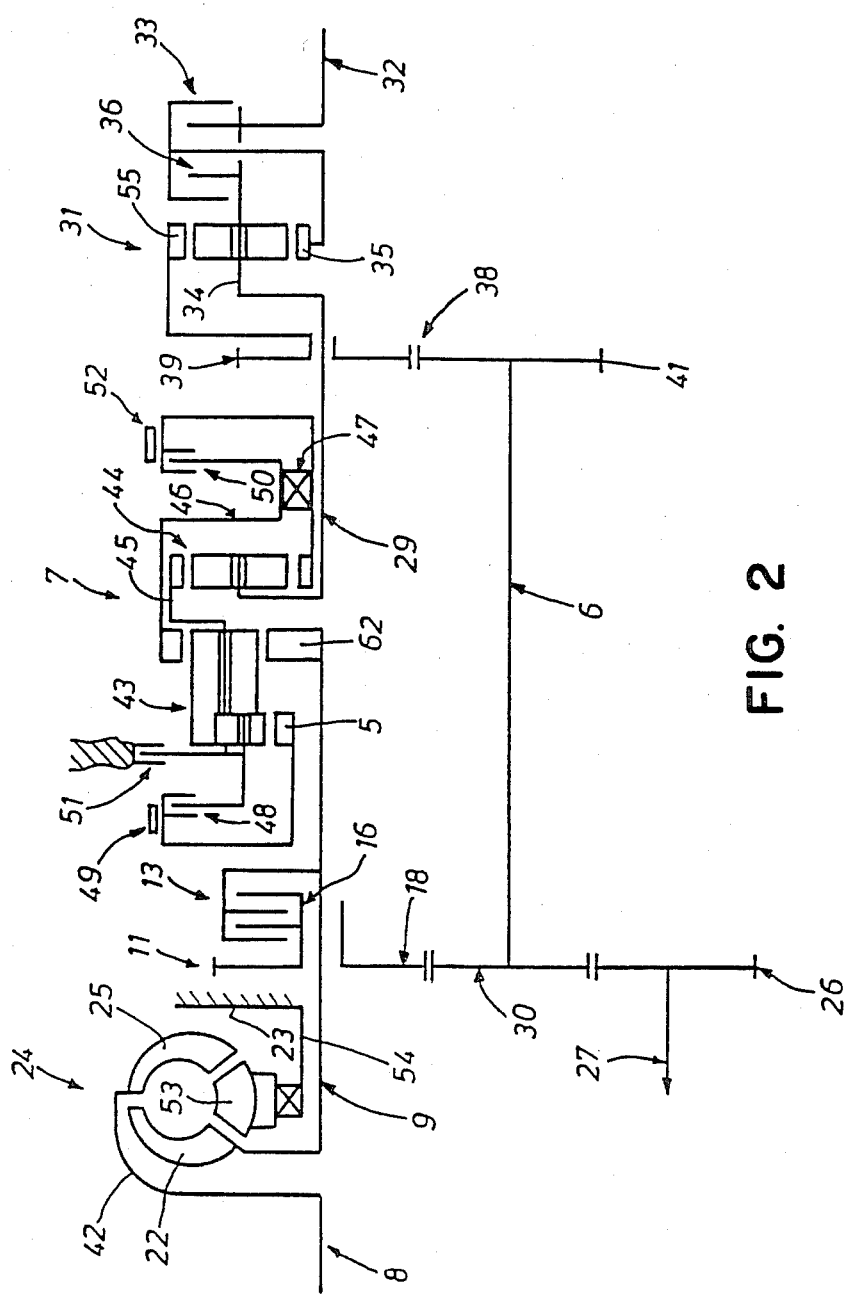
FIG. 2 is a schematically shown drive arrangement according to the invention of FIG. 1, but with a connectable rear axle drive.

In the case of both embodiments of FIGS. 1 and 2, a hollow shaft 16 is arranged between the housing wall 23 and the forward planetary wheel unit 43, said hollow shaft 16 being penetrated by the input shaft 9 with clearance and being able to be coupled via a clutch 13 with the input shaft 9. The hollow shaft 16, is drivingly connected with a ring gear 18 that forms the input gear of an auxiliary transmission 11, the output of which is formed by the gear 30 of the auxiliary drive shaft 6. Gears 18 and 30 mate directly with one another. The clutch 13 can, for example, be engaged when the gear shift transmission 7 is moved into its neutral position, i.e., when the torque transmission in the gear shift transmission 7 is interrupted.

In this situation when the gear shift transmission is interrupted, torque transmission takes place from the input shaft 9 via the auxiliary transmission 11, the auxiliary drive shaft 6 and the interaxle differential 31 to the rear axle drive. During start up of the vehicle, input shaft 9 is connected with the output rotor 22 of the torque converter 24 and is driven at a rotational speed that is reduced by the slip of the converter with respect to the driving engine 8. By means of the auxiliary transmission 11 in connection with the gear 38 of the auxiliary drive shaft 6, a very low first gear is obtained for the rear axle during starting which is independent of the gear shift transmission 7. In the case of the embodiment of FIG. 1, if desired, the clutch 28 can be actuated to connect the front axle 27 to the same gear drive through the auxiliary transmission 11 and gears 18 and 30.

Figure 3:
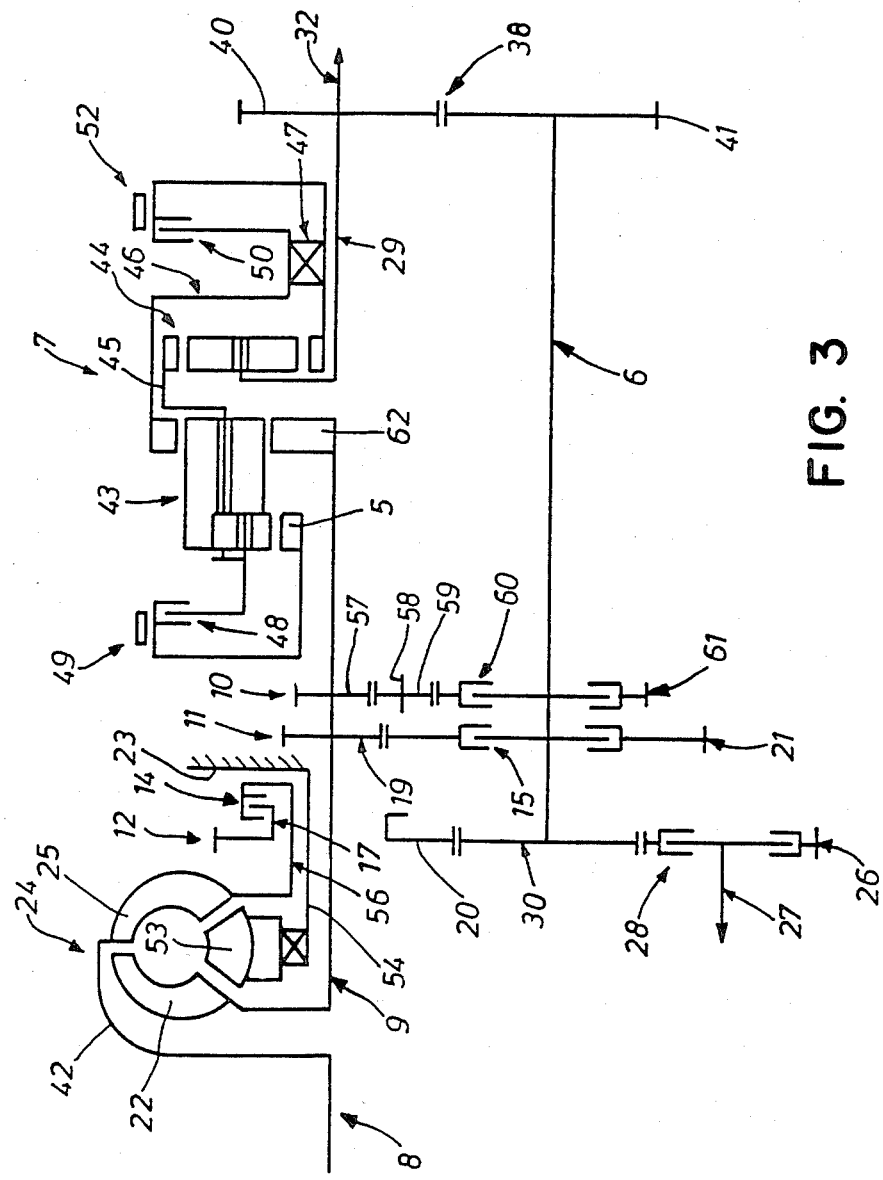
FIG. 3 is another schematically shown embodiment of a drive arrangement according to the invention with a connectable front axle drive.

In the embodiment of FIG. 3, the output shaft 29 is drivingly connected with the drive shaft 32 leading to the rear axle drive as well as with the input gear 40 of the transmission gear 38. The input gear 40 mates directly with the gear 41 of the auxiliary drive shaft 6. Correspondingly, the front axle drive can be connected by means of a clutch 28 arranged between the shaft 27 and its gear 26.

In the embodiment of FIG. 3, an auxiliary transmission 11 is also arranged between the housing wall 23 and the forward planetary wheel unit 43, the ring-shaped input gear 19 of said auxiliary drive transmission 11 being disposed to be driven by the input shaft 9. The input gear 19 mates directly with an output gear 21, which can be coupled with the auxiliary drive shaft 6 by means of a clutch 15. In this embodiment, the input gear 19 of the auxiliary drive transmission 11 is connected with the output rotor 22 of the torque converter 24 so that a low first gear for starting is obtained that is independent of the gear transmission mechanism 7.

In the embodiment of FIG. 3, an additional auxiliary transmission 12 is arranged between the torque converter 24 and the housing wall 23. The stator shaft 54 as well as the input shaft 9 penetrate a hollow shaft 17, that is arranged between the housing wall 23 and the torque converter 24 and is connected with a clutch 14. The driving connection between the clutch 14 and the impeller 25 is via a hollow shaft 56 that is disposed concentrically between the hollow shafts 17 and 54. The hollow shaft 17, is drivingly connected with the input gear 20 of an auxiliary transmission 12, the output gear of which is formed by the forward gear 30 of the auxiliary drive shaft 6. The gears 20 and 30 mate directly with one another. The clutch 14 can be engaged only when the torque transmission in the gear shift transmission 7 is interrupted. The hollow shaft 17 rotates at the rotational speed of the driving engine so that upon shifting of the clutch 14, a fast gear can be achieved that is preferably independent of the gear shift transmission 7. In this fast gear, the front axle drive 27 can be drivingly connected by means of the slip control of the clutch 28. The torque transmission to the rear axle drive 32 will then take place via the auxiliary drive shaft 6 and the gear stage 38 to the drive shaft 32.

The embodiment of FIG. 3 therefore operates by means of an auxiliary transmission 11 that is driven by the input shaft 9 of the output rotor 22 and is used for forming a low starting gear, as well as with an additional auxiliary gear 12 that is driven by the impeller 25 and is used for forming a fast gear.

For forming a reversible gear drive that is independent of the gear shift transmission 7 in the embodiment of FIG. 3, a third auxiliary transmission 10 is also provided that has an input gear wheel 57 that is torsionally fixed with respect to the input shaft 9 and is disposed between the housing wall 23 and the gear shift transmission 7 and drivingly mates with an intermediate gear wheel 59 that is disposed on an intermediate shaft 58. Said intermediate gear wheel 59 itself mates with a spur gear 61 that can be coupled with the auxiliary drive shaft 6 by means of a clutch 60. By means of this auxiliary transmission 10, the brake 51, that is engaged in the embodiments of FIGS. 1 and 2 for drive and connected with the coupling shaft 45, is no longer necessary and thus the shifting expenditures are increased only insignificantly by this third auxiliary transmission 10.

The tabular chart of FIG. 4 explains the various possible connections providing different speeds for the three alternatives of FIGS. 1, 2 and 3.

The gear shift transmission 7 provides for four forward gears I-IV and one reverse gear R and can be shifted by means of clutches 47, 48 and 50 and by means of the brakes 51 and 52. FIG. 3 provides for an exception to the gear operation of gear shift transmission 7. In that case, the brake 51 for the reverse gear of the two other embodiments is replaced by the auxiliary gear 10 with its clutch 60 on the auxiliary drive shaft 6 by means of which a reverse gear can be formed that is independent of the gear shift transmission 7, which will be discussed below.

In the lowest forward gear I of the gear shift transmission 7, the front ring gear of the first planetary unit 43 and the rear sun gear of the rear planetary unit 44 are braked to a standstill by brake 52, and the front sun gear 62 is driven via the input shaft 9 of the output rotor 22 so that the gear transmission is achieved by the multiplicative linking of the shifted partial transmissions of the two planetary units 43 and 44.

In the second lowest forward gear II of the gear shift transmission 7, the front ring gear of the first planetary unit 43, via the one-way clutch 47, supports itself at the sun gear of the rear planetary unit 44 that continues to be braked by brake 52, while the forward smaller sun gear 5 is now braked to a standstill by brake 49 and the adjacent larger interior sun gear 62 continues to be driven via the input shaft 9. Here also, the gear transmission is maintained by the multiplicative linking of the shifted partial transmissions of the two planetary units 43 and 44. But here, the partial transmission of the forward planetary wheel unit 43 is increased while its ring gear operates as a reaction member and rotates slowly in the rotational direction of the drive.

In the forward gear III of the shift transmission 7, the sun gear of the rear planetary unit 44 continues to be braked to a standstill by brake 52 and the rear ring gear of the rear planetary unit 44 is driven by the planetary wheel transmission 43 by means of the coupling shaft 45 that, by means of the clutch 48, is shifted into a partial transmission of 1:1, so that the drive is formed only in the rear planetary gear unit 44.

In the direct forward gear IV of the gear shift transmission 7, the rear planetary wheel unit 44 is also blocked by clutch 50 and thus, the output shaft 29, rotates at the rotational speed of the input shaft 9.

In the reverse gear of the gear shift transmission 7 of FIGS. 1 and 2, the forward planetary carrier and the ring gear of the rear planetary unit 44 are braked to a standstill by the brake 51 and the forward larger interior sun gear 62 is driven by the input shaft 9, so that the output shaft 29 is driven by means of the interior sun gear of the rear planetary unit 44, via the connected ring gear of the front planetary unit 43 being driven in a direction opposed to the rotational direction of the input shaft 9.

When the torque transmission is interrupted in the gear shift transmission 7, with the aid of the respective auxiliary transmission 11, in the case of all embodiments (FIGS. 1 to 3), an additional lowest gear $I_{(11)}$ that is lower than gear I of the gear shift transmission 7 is obtained in the following way:

In the case of the embodiment of FIG. 1, the clutches 13, 28 and 36 are engaged jointly so that the torque transmission takes place from the direction of the output rotor 22 of the torque converter 24 via the input shaft 9 into the auxiliary transmission 11, and hence from gear 18 to gear 30 which drives the gear 26 belonging to the front axle drive 27 if the clutch 28 is being controlled, while the auxiliary drive shaft 6 of the gear 30, via the gear 38 and the blocked interaxle differential 31, drives the drive shaft 32 to the rear axle drive.

In the case of the embodiment of FIG. 2, the clutches 13, 33 and 36 are engaged so that both axle drives—in this case if the clutch 33 is being controlled—participate in the drive as in the case of the embodiment of FIG. 1 via gear 18, gear 30 and gear 26 to the front drive shaft 27 and via shaft 6, gear 41 and gear 38 to transmission 31 for the rear drive shaft 32.

In the case of the embodiment of FIG. 3, the clutches 15 and 28 are engaged so that if the clutch 28 is being controlled, both drive shafts 27 and 32 for the front and rear axle drive participate in the torque transmission. The drive for the front drive 27 comes via gears 15, 19 and 30, clutch 28 and for the rear drive 32 from shaft 6 and gears 41 and 40.

When the gear shift transmission 7, in the case of the embodiment of FIG. 1, is shifted into its direct transmission—thus into the IVth gear—a fast gear V is obtained by the engaging of the clutch 13, because then in the interaxle differential 31, the planetary carrier 34 is driven at the rotational speed of the input shaft 9, whereas the sun gear 35 is driven at a rotational speed that is slowed down by the auxiliary transmission 11 so that the sun gear 55 connected with the drive shaft 32 for the rear axle drive is accelerated.

Finally, also in the case of the embodiment of FIG. 3 that does not have an interaxle differential, a fast gear V is made possible by the fact that the gear shift transmission 7 is brought into its neutral position interrupting the torque transmission and the clutch 14 is engaged, so that a transmission ratio can be achieved between the rotational speed of the input rotor 25 driving the auxiliary transmission 12 and the rotational speed of the gear 40 that is drivingly connected to the drive shaft 32 of the rear axle drive. In this case, the four-wheel operation is possible by the engaging and control of the clutch 28 for the front axle drive.

In the case of the embodiment of FIG. 3, a reverse gear $R_{(10)}$ is obtained by the engaging of the clutch 60 of the auxiliary transmission 10 if the torque transmission is interrupted in the gear shift transmission 7. This operates similar to the transmission drive through transmission 11 except that a reverse drive is obtained by extra gear 58. In this case also, a four-wheel drive operation is possible during an engaging of the clutch 28 for the front axle drive.

The auxiliary transmissions 10 and 12 may be used separately by themselves or in each case together with the auxiliary transmission 11 or also with other auxiliary transmissions.

While I have shown and described plural embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed is:

1. A drive arrangement for a motor vehicle having a four-wheel drive establishable by connecting one wheel axle with another drivable wheel axle, and wherein said one wheel axle is driven by an input shaft drivable by a driving engine via an auxiliary drive shaft and a gear shift transmission, the auxiliary drive shaft and gear shift transmission being arranged parallel to an axis of the input shaft, the auxiliary drive shaft and the input shaft being brought into direct driving connection with one another by means of an auxiliary transmission, at least one of these two auxiliary drive shafts and input shafts, being brought into driving connection with the auxiliary transmission by engagement of a clutch means and the clutch means being engaged only when torque transmission in the gear shift transmission is interrupted and an interaxle differential means that is connected between the two wheel axles is brought into an unblocked condition.

2. A drive arrangement according to claim 1, wherein the input shaft is rotatable within a hollow shaft gearingly connected with the auxiliary drive shaft as well as with the clutch means of the auxiliary transmission.

3. A drive arrangement according to claim 1, wherein the input shaft is gearingly connected with the auxiliary drive shaft, by means of the clutch means, and is connected with an output gear of the auxiliary transmission.

4. A drive arrangement according to claim 1, wherein the input shaft is connected with an output rotor of a hydrodynamic flow unit arranged on a side of a radial housing wall that is opposite the gear shift transmission, and wherein as input gear of the auxiliary transmission is arranged between the gear shift transmission and the radial housing wall.

5. A drive arrangement according to claim 1, wherein a hydrodynamic flow unit drives the input shaft from the engine and a radial housing wall is located between the gear shift transmission and the hydrodynamic flow unit, and wherein a hollow shaft surrounds the input shaft and is arranged between the hydrodynamic flow unit and the housing wall and is capable of being brought into driving connection with an input rotor of the hydrodynamic flow unit.

6. A drive arrangement according to claim 1, wherein a gear on the auxiliary drive shaft is in driving engagement with a gear on a pinion shaft leading to a front wheel axle and which is used as an output gear of the auxiliary transmission.

7. A drive arrangement according to claim 1, wherein an input and output gear of the auxiliary transmission mate directly with one another.

8. A drive arrangement according to claim 1 wherein the input shaft and a hollow shaft are concentric with respect to one another and are driven by a hydrodynamic flow unit and are each connected with the auxiliary transmission.

9. A drive arrangement according to claim 1, wherein a pinion shaft of one axle is clutched to a gear that mates with a second gear on the auxiliary drive shaft.

10. A drive arrangement according to claim 1, wherein the auxiliary drive shaft is geraingly in permanent driving connection with an output shaft of the gear shift transmission that is coaxial with an axis of the input shaft.

11. A drive arrangement according to claim 1, wherein the auxiliary drive shaft is connected with an output shaft of the gear shift transmission by means of an interaxle differential means.

12. A drive arrangement according to claim 11, wherein the interaxle differential means connects gearing thereof with a gear arranged on the auxiliary drive shaft and coaxially with respect to an output shaft of the gear shift transmission.

13. A drive arrangement according to claim 1, wherein the interaxle differential means is clutched, with a drive shaft leading to the rear wheel axle.

14. A drive arrangement according to claim 1, wherein an input gear is geared to the auxiliary drive shaft and is connected with an output shaft.

15. A drive arrangement according to claim 1, wherein a pinion shaft connected to one axle is engaged by a clutch means to be controllable in its rotational speed ratio and can be engaged together with a second clutch means of the auxiliary transmission which in turn is connected with the output rotor of a hydrodynamic flow unit driven via the input shaft.

16. A drive arrangement according to claim 1, wherein for a forward gear drive, the gear shift transmission is shifted into a direct gear drive with the gear clutch means of the auxiliary transmission connected with an output rotor of a hydrodynamic flow unit via the input shaft and the interaxle differential means is connected between the wheel axles.

17. A drive arrangement according to claim 16, wherein an output shaft of the gear shift transmission is connected with a planetary carrier of the interaxle differential means, and a gear on the auxiliary drive shaft is gearingly connected to a ring gear of said planetary carrier and is rotatably and coaxially with respect to the output shaft of the gear shift transmission, and wherein the output shaft is connected a central gear of the planetary carrier, and wherein a drive shaft leading to the rear axle drive is connected with another gear of the interaxle differential.

18. A drive arrangement according to claim 1, wherein input and output gears of the auxiliary transmission mate with an intermediate gear arranged centrically with respect to a third shaft to provide for a reverse drive.

19. A drive arrangement according to claim 1, wherein at least two auxiliary transmissions are driven by at least one of the input shaft and a hollow shaft to provide a drive to one of the axles.

20. A drive arrangement according to claim 1, wherein in one forward gear, torque transmission in the gear shift transmission is interrupted and a clutch means on a pinion shaft connected to one axle can be engaged together with the clutch means of the auxiliary transmission to connect a input rotor of a hydrodynamic flow unit with the auxiliary drive shaft via a hollow shaft.

* * * * *